Dec. 17, 1963

R. C. WILSON 3,114,288

CHAIN SHIFT MECHANISM FOR DUAL HOISTS

Filed Dec. 12, 1962

INVENTOR
Richard C. Wilson

BY Claude Funkhouser
ATTORNEY

Dec. 17, 1963   R. C. WILSON   3,114,288
CHAIN SHIFT MECHANISM FOR DUAL HOISTS
Filed Dec. 12, 1962   8 Sheets-Sheet 6

Dec. 17, 1963  R. C. WILSON  3,114,288
CHAIN SHIFT MECHANISM FOR DUAL HOISTS
Filed Dec. 12, 1962  8 Sheets-Sheet 8
FIG. 12
FIG. 13
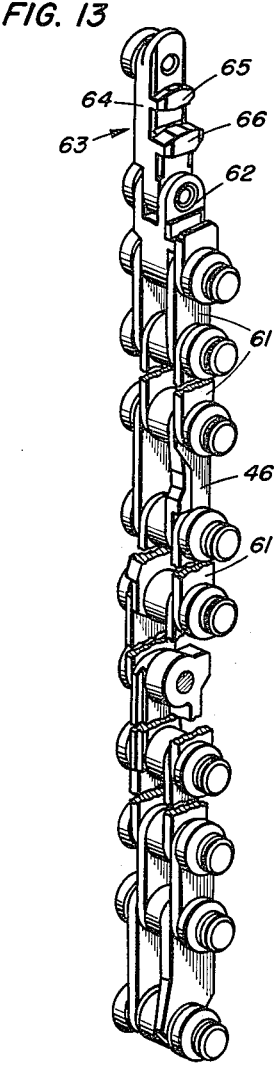
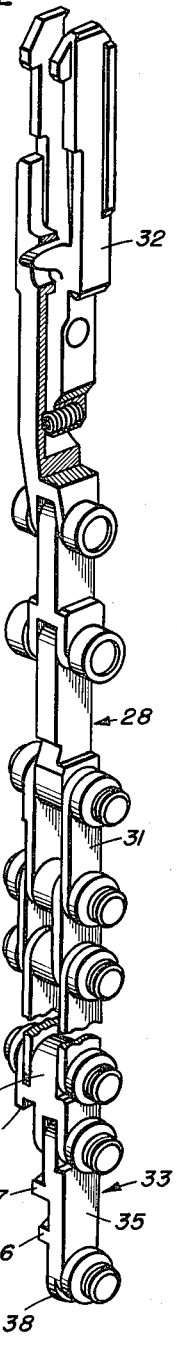

United States Patent Office 3,114,288
Patented Dec. 17, 1963

3,114,288
CHAIN SHIFT MECHANISM FOR DUAL HOISTS
Richard C. Wilson, Champlin, Minn., assignor, by mesne assignments, to the United States of America as represented by the Secretary of the Navy
Filed Dec. 12, 1962, Ser. No. 244,228
20 Claims. (Cl. 89—1.7)

The present invention relates to a shift mechanism and more particularly to a chain shift mechanism suitable for use with a guided missile launching system.

In guided missile launching systems now in use, a pair of concentric annular rings or missile cells are employed to stow missiles in a vertical position for delivery to the launcher guide. To accomplish this a hoisting device is required so that one missile at a time can be raised onto a launcher guide, which guide can be positioned vertically above either ring of missiles, each missile being raised by a pawl mounted on the end of a link chain driven by a sprocket coupled to a suitable power drive. After delivery of a missile onto the launcher guide, the chain is retracted and coiled in a stowage housing. Heretofore, to hoist a missile from either of two positions such, for example, from each cell, two set of pawls, chain drive sprockets, and stowage housings were required and also a transfer drive with a shift arrangement to couple the power drive to either sprocket separately.

The present invention contemplates the provision of a new and improved chain shift mechanism which enables one drive chain to be coupled to either pawl assembly so that only one chain stowage housing and one sprocket coupled to the power drive are required. Briefly, the device of the present invention comprises a chain stowage housing, an actuating chain therein, a drive sprocket housing, a drive sprocket therein, a chain shifter pivotally mounted on the drive sprocket housing, a pair of curved tracks and a pair of hoist chains movable through the curved tracks, either of which hoist chains may be releasably attached to the actuating chain according to the direction of movement of the chain shifter.

An object of the invention resides in the provision of a new and improved chain shift and dual hoist suitable for use with a guided missile system magazine.

Another object of the invention is to provide a shift mechanism which enables a driven chain to be releasably coupled to either missile hoist chain of a pair of missile hoist chains.

A further object of the invention is to provide a chain hoist mechanism wherein a shiftable device couples a driven chain to either one of a pair of missile hoist chains.

A still further object of the invention is to provide a chain hoist mechanism wherein the terminal end of a driven chain is selectively coupled to the terminal end of either one of a pair of hoist chains in accordance with the direction of movement of a chain shifting device.

Other objects, advantages and novel features of the invention will become apparent from the following detailed description of the invention when considered in conjunction with the accompanying drawings wherein:

FIG. 7 is an enlarged fragmentary view in section illustrating the stop device for the inner hoist chain;

FIG. 7A is a view similar to FIG. 7 illustrating the stop device for the outer hoist chain;

FIG. 8 is a detail view illustrating the driving mechanism for the main chain;

FIG. 9 is a view in plan of the mating half link for interconnecting the main and hoist chains;

FIG. 12 is a fragmentary isometric view of one of the pawl assemblies; and

FIG. 13 is a view similar to FIG. 12 illustrating a fragmentary portion of the main or actuating chain.

Figure 1:
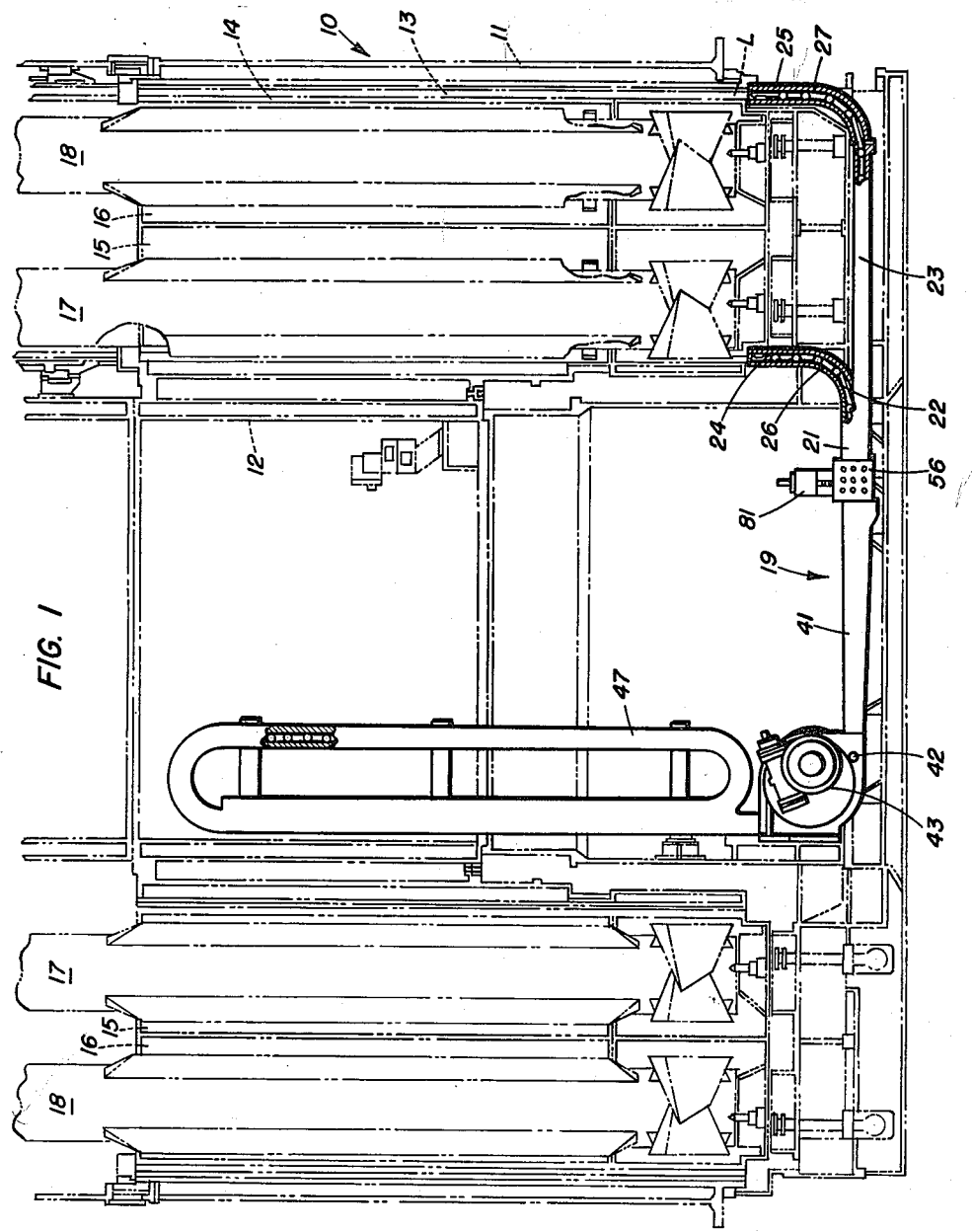
FIG. 1 is a fragmentary sectional view of a missile stowage or magazine structure illustrating the device of the present invention in connection therewith and in its schematic form.

Referring now to the drawings and more particularly to FIG. 1 thereof, the numeral 10 indicates generally a conventional missile stowage structure used in connection with a guided missile launching system and comprises an outer casing 11 and an inner casing 12 in spaced relation with the outer casing 11 to form a circular chamber 13 therebetween. Rotatably mounted on the inner and outer casing in the conventional manner is a missile magazine 14 having inner and outer missile rings and supports 15 and 16, the missiles being shown in dashed outline and indicated by the numerals 17 and 18.

At the missile loading station L, under the missiles 17 and 18 the chain shift and dual hoist mechanism of the present invention indicated generally by the numeral 19 is arranged. The mechanism 19 comprises a main housing 21 having a pair of auxiliary housings 22 and 23 formed therewith and extending therefrom and terminating in curved end portions 24 and 25. The auxiliary housing 22 is provided with an inner chain track or channel 26, the auxiliary housing 23 being provided with an outer chain track or channel 27, the aforesaid tracks or channels 26 and 27 extending into the main housing 21. A hoist or pawl unit indicated generally by the numeral 28 is disposed in the channel 26 and a similar hoist or pawl unit indicated generally by the numerals 29 is disposed in the channel 27. Each of the pawl units 28 and 29 are identical in structure and include a link chain structure 31 having a missile engaging and clamping pawl 32 at one end and a half or connecting link 33 at the other end thereof, the half link being connected to the chain 31 by link or connector 34, as best shown on FIGS. 3, 6, 9 and 12. Each half link of the inner and outer pawl units comprises a member or plate 35 having a short lug 36 and a long lug 37 extending therefrom and disposed in mutual spaced relationship, which space is slightly greater in width than the thickness of the long lug 37. The half links are further provided with a tongue 38 and the connector links 34 are provided with a complementary groove 39, the purpose of which will be set forth as the description proceeds.

Figure 2:
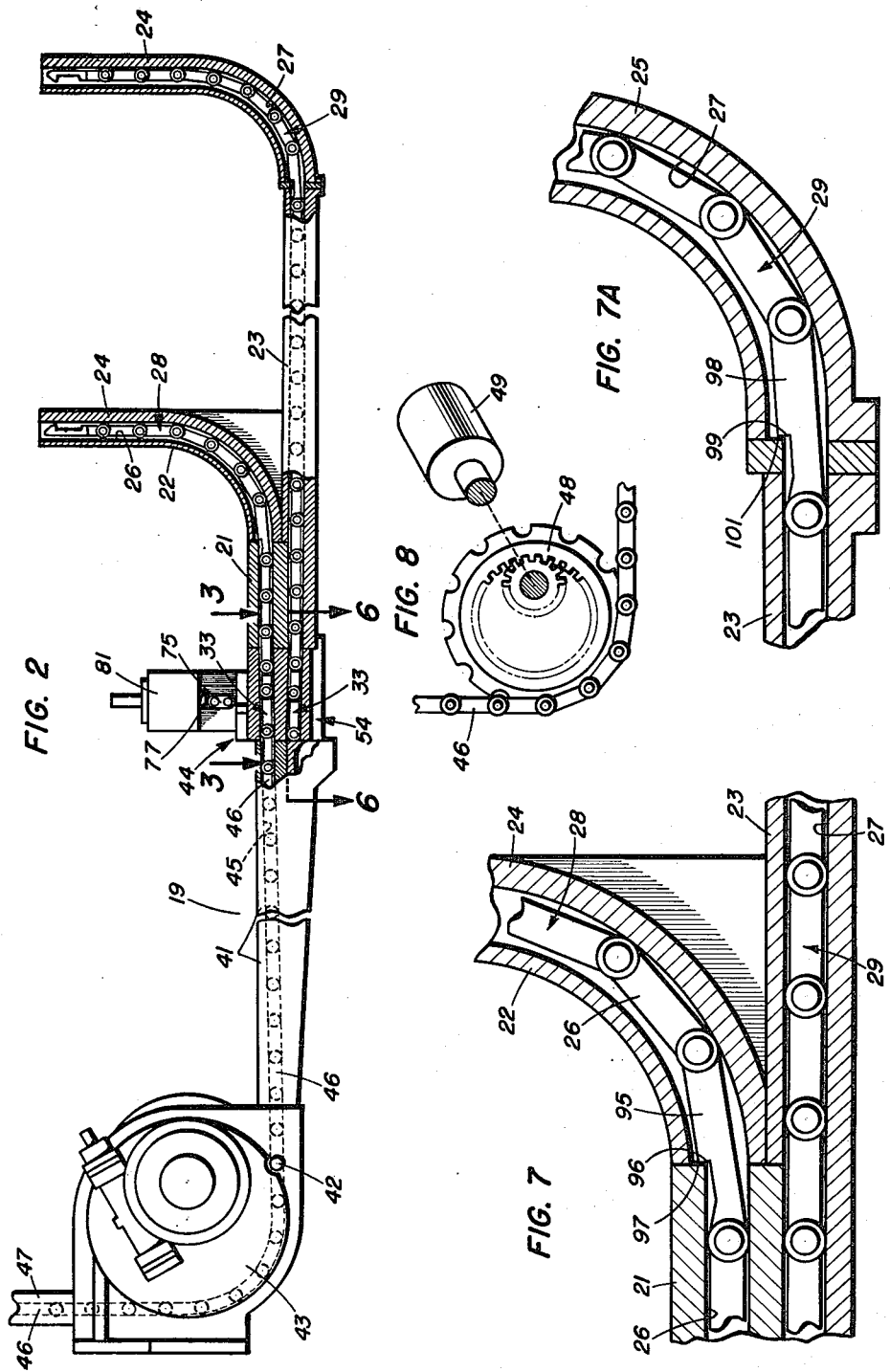
FIG. 2 is an enlarged view partially in elevation and partially in section of the device of the present invention.
Figure 4:
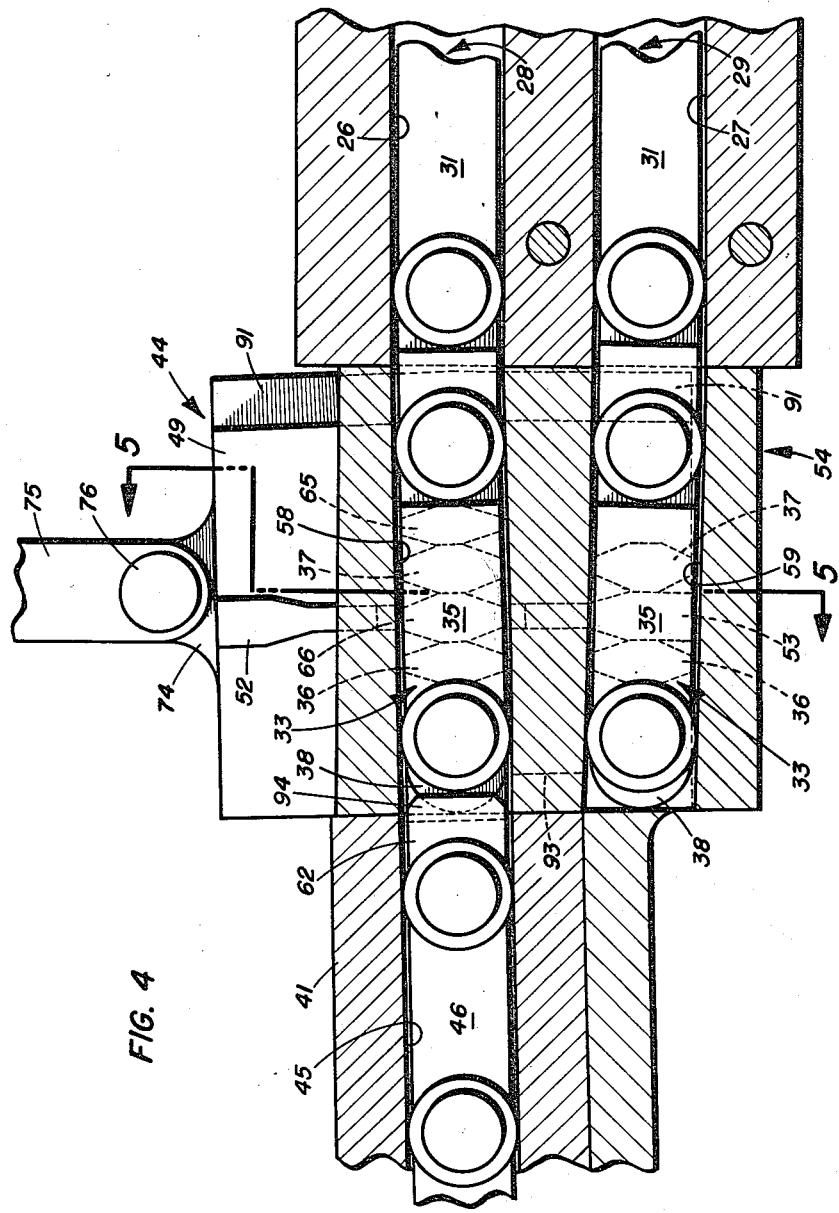
FIG. 4 is a sectional view taken substantially on the line 4—4 of FIG. 3.
Figure 10:
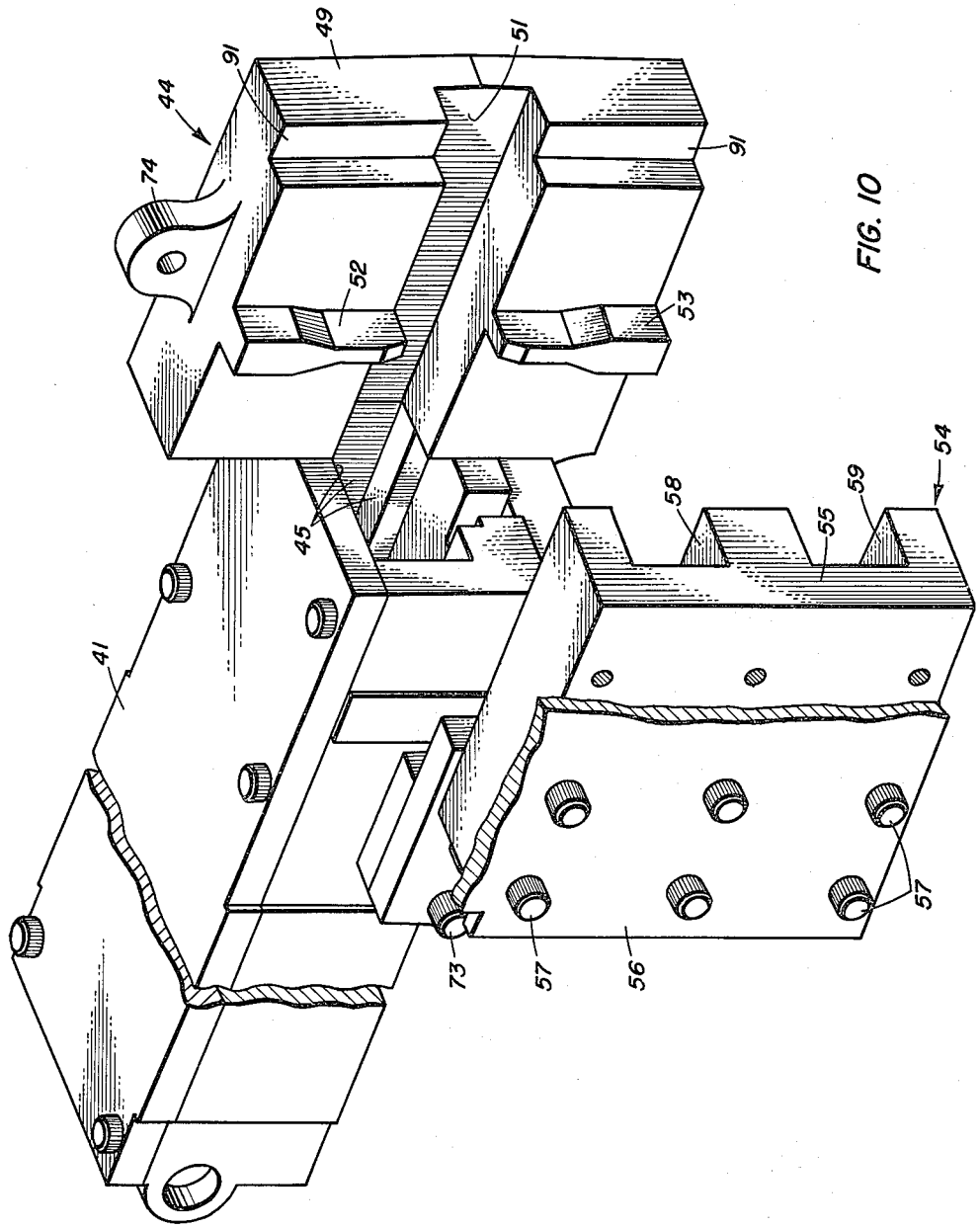
FIG. 10 is an isometric view of the chain shift mechanism partially broken away and in section.

The shift mechanism 19 includes a housing 41 pivoted at one end, as at 42, to a sprocket housing 43, FIGS. 1 and 2 and having a shifter head indicated generally by the numeral 44 carried at the other end thereof, as best shown in FIGS. 2, 4 and 10. The housing 41 is provided with a chain track or channel 45 which receives the main or driven chain 46, the chain being disposed in a stowage housing 47, FIGS. 1 and 2, in driving connection with a sprocket 48 driven by a motor 49, FIG. 8.

The shifter head 44 includes a member 49 carried by the housing 41, the member 49 being substantially one-half the width of the housing 41, as best shown in FIGS.

3 and 10. The member 49 is provided with a centrally disposed groove or half track 51, FIGS. 5 and 10, which track is in alignment with the track 45 in housing 41, the member 49 being further provided with a pair of locking lugs 52 and 53, with lug 52 disposed above groove 51 and lug 53 disposed below groove 51.

The inner end of chain housing 21 mates with a component part of the shifter head 44, indicated generally by the numeral 54, and includes a member or support 55 attached to one of the side plates 56, as by bolts or the like 57, the side plates being carried by the housing 21. The member 55 is less than half the width of the normal chain track 45 and is provided with an upper half-link groove 58 and a lower half-link groove 59, as best shown on FIGS. 4 and 10. It will be noted in FIG. 4 that the upper groove 58 is inclined slightly downwardly so that its centerline intersects the chain shifter pivot 42, while the lower groove is inclined slightly upwardly so that its centerline also intersects the aforesaid pivot 42.

In FIG. 4 it will be noted that the half-link 33 on chain 31 of inner pawl unit 28 is normally disposed in groove 58 and aligns with the inner track 26, while the half-link 33 on chain 31 of outer pawl unit 29 is normally disposed in groove 59 in alignment with the outer track 27.

Figure 3:
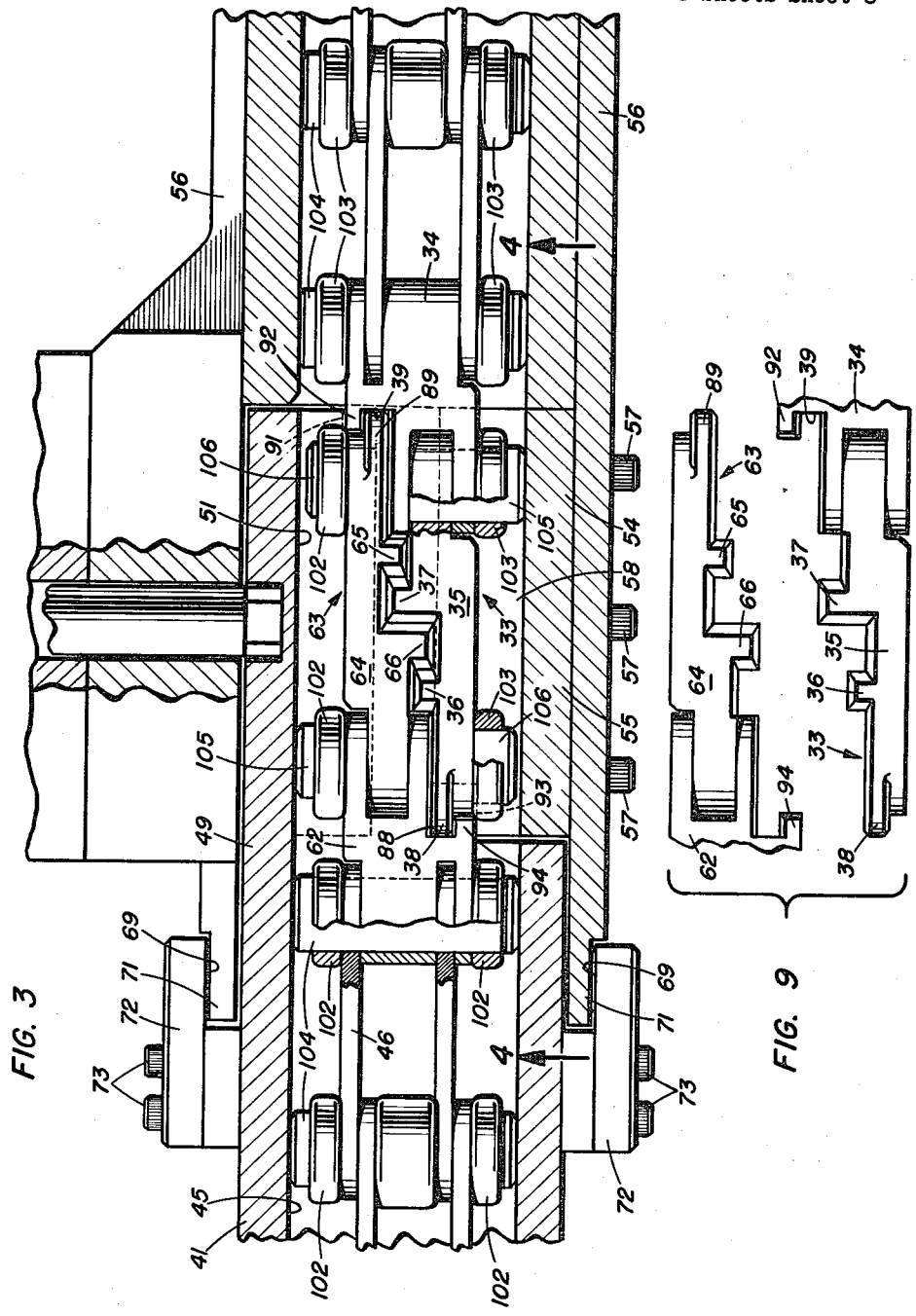
FIG. 3 is an enlarged fragmentary sectional view taken substantially on the line 3—3 of FIG. 2.

To facilitate coupling of the main chain 46 to either of the pawl units 28 or 29, the links 61 at one end thereof are provided with a connector link 62 similar to connector link 34, the connector link being connected to a half link indicated generally by the numeral 63, FIGS. 3 and 9. The half-link 63 is similar to half-links 33 and are constructed and arranged to have interlocking relation with the half-links 33 on the inner and outer pawl units 29 and 28, whereupon the main chain 46 may be coupled to either half-link 33 of the inner or outer pawl units to hoist either the inner or outer missile from stowed position to a luncher receiving position. The half-link 63 comprises a member or plate 64 having a short lug 65 and a long lug 66 extending therefrom in mutual spaced relationship which space is slightly greater in width than the thickness of the long lug 66. The half link 63 is further provided with a tongue 67, the connector link 62 being provided with a complementary groove 68.

As more clearly shown in FIG. 3 the side plates 56 are disposed on opposite sides of the housing and the shifter mechanism and have the terminal ends thereof cut away as at 69 to provide a bearing surface 71. Clips or clamping elements 72 are secured to each plate 56, as at 73, and engage the bearing surface 71 thereon to align and maintain the tracks in a vertical plane.

The member or plate 49 of shift head 44 is provided with an ear or lug 74 having at one end a pair of links 75 pivotally connected thereto, as at 76, the other end of the links being pivotally connected to a piston shaft or plunger 77, as at 78, the plunger carrying a piston 79 operating in a fluid pressure device 81. Thus by this arrangement the shifter head may be moved to cause interlocking engagement between the half-link 63 on the main chain 46 with either half-links 33 on the inner and outer pawl units 28 and 29, the interlocking relation between the aforesaid half-links 33 and 63 being clearly shown in FIG. 3.

Figure 5:
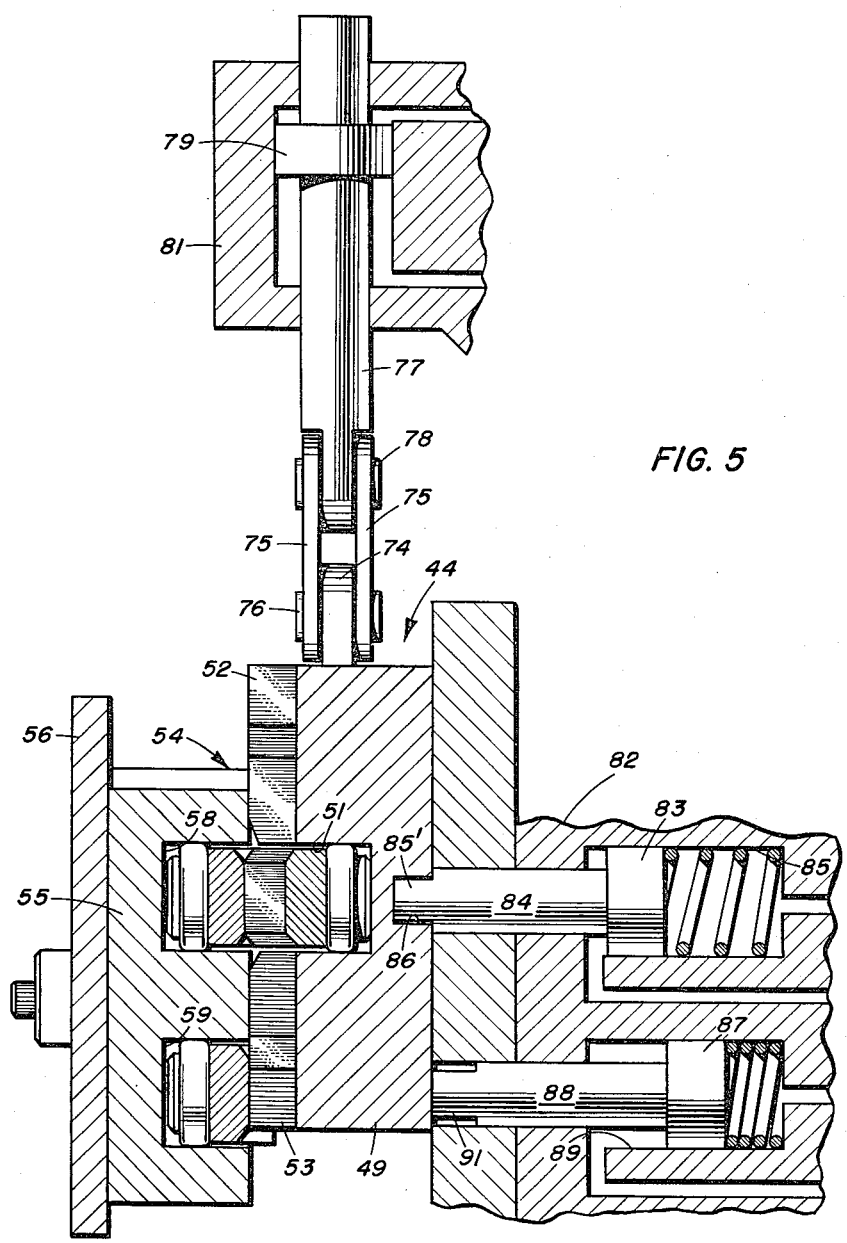
FIG. 5 is a sectional view taken substantially on the line 5—5 of FIG. 4.

To facilitate locking of the shifter head 44 in its operating position such, for example, as when the main chain 46 is coupled to the inner hoist pawl unit 28, FIG. 5, a fluid pressure device 82 is employed. The device 82 includes a spring biased fluid operated piston 83 carried by a rod 84 and disposed within a pressure or operating chamber 85, the free end of the rod having a locking detent 85 in locking engagement with an opening or recess 86 formed in the plate or member 49 of the head 44. When the main chain 46 is coupled to the outer pawl unit 29, the shifter head is locked in its operating position by a spring biased, fluid operated piston 87 carried by a rod 88 and disposed within a pressure or operating chamber 89, the free end of the rod having a locking detent 91 adapted to engage the aforesaid recess or opening 86. Thus, by this arrangement the main chain and the pawl units are maintained in alignment with their respective grooves and tracks during a missile hoisting operation.

FIGS. 4 and 5 illustrate the relationship of the various components of the device when the head 44 has been raised to couple the main chain 46 to the inner pawl unit. It will be noted, FIG. 5, that the groove 51 in member 49 is directly opposite the upper groove 58 in member 55 thus forming a continuous trackway for passage of the main chain 46 from the shifter head 44 or through the inner track or channel 28 of the housing 21 and the curved end 24 thereof. During this operation the half-link 33 of the outer pawl unit 29 is retained in the lower groove 59 of the member 55 by the locking lug 43 on the shifter head 44.

Shifting of the shifter head 44 from the one position to the other position such, for example, as from an inner pawl unit engaging position to an outer pawl engaging position can be accomplished only when the main chain 46 is retracted to a position so that the half-link 33 of the inner pawl unit 28 is directly above the half-link 33 of the outer pawl unit, as best shown in FIG. 4. Furthermore, in this position the long lug 66 on the half-link 63 of the main chain 46 is aligned with the locking lugs 52 and 53 of the shifter head 44. Thus, as the shifter head 44 is moved in a downwardly direction, the lower locking lug 53 disengages from the half-link 33 of the outer pawl unit 29. However, before the locking lug 53 is completely disengaged from link 33, the complementary half-link 63 of the main chain 46 is partially engaged with the half-link 33 of the outer pawl unit 29. Concurrently therewith, the half-link of the inner pawl 28 is disengaged from the half-link 63 of the main chain 46 and engaged by the upper locking lug 52.

It will be noted in FIG. 3 that the connector link 62 on the main chain 46 is provided with a recess 88 similar to the recess or groove 39 in connector link 34 and receives tongues 38 on the half-links 33 of the pawl units when the half-links 33 and 63 are in a coupled condition. In like manner, the half-link 63 is provided with a tongue 89 which is received by the groove 39 in the connector link 34 of the pawl units when the half-links are in the coupled condition. Thus, by this arrangement the half-links are locked and maintained in alignment. It will be further noted in FIG. 3 that when the half-links 33 and 63 are in a coupled condition the short and long lugs on the half-links interlock to transmit longitudinal loads between the main chain 46 and either of the pawl units 28 and 29.

Figure 6:
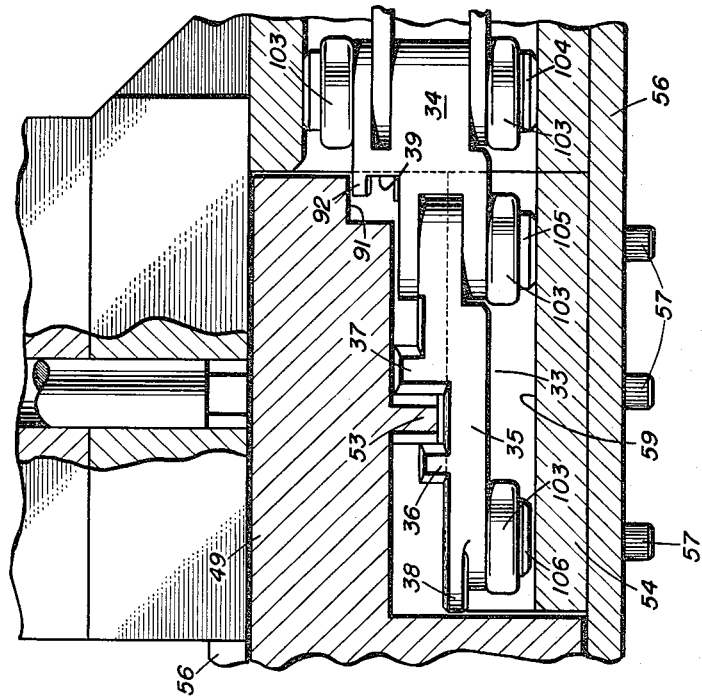
FIG. 6 is an enlarged fragmentary sectional view taken substantially on the line 6—6 of FIG. 2, illustrating the outer hoist chain and the shifter assembly, and the connection therebetween.
Figure 11:
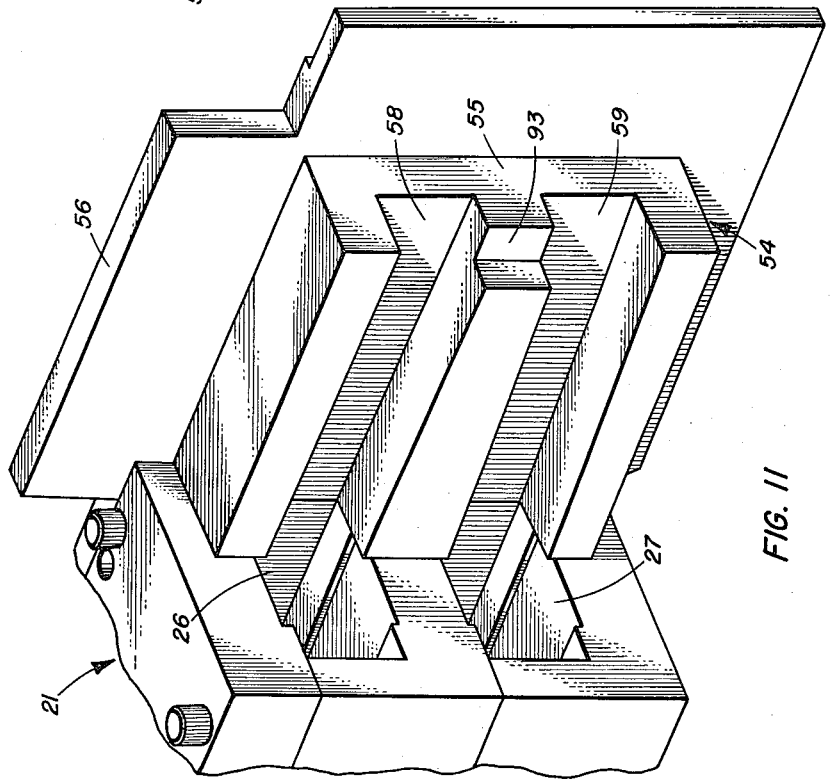
FIG. 11 is an isometric view of one of the components of the chain shift mechanism.

The inner face of the member 49 of the shifter head 44 has formed therein notches 91 for providing clearance for the ends 92 on the connectors 34 of the inner and outer pawl units, FIGS. 3 and 6. The inner surface of the member 55 of the component part 54 of the shifter mechanism has formed therein a notch 93 for providing clearance for the end 94 of the connector 62, FIGS. 3, 4 and 11. Thus, by this arrangement the main chain 46 may be readily coupled to either of the pawl units 28 and 29.

As more clearly shown on FIG. 7 and to control the movement of the inner pawl unit to locate the half-link 33 thereon in proper coupling position, the chain 31 of the inner pawl unit 28 is provided with a lock link 95 having a detent 96 engageable with the housing 21, as at 97, during retraction of the inner chain. A similar control device is provided on chain 31 of the outer pawl unit 29 and includes a lock link 98 having a detent 99 engageable with the auxiliary housing 23, as at 101, to locate the half-link 33 thereon in proper coupling position during retraction of the outer chain.

To facilitate easy movement of the main chain and pawl chains within the aforesaid tracks and grooves during extension and retraction thereof the main chain and the half links thereon are provided with rollers 102, and the chains and the half-links of the inner and outer pawl units are provided with similar rollers 103. The rollers 102 and 103 may be mounted in any conventional manner such, for example, as on cross shaft 104, short shaft 105 and stub shaft 106, as best shown in FIGS. 3 and 6. It will be noted in FIG. 3 that when the half-links 33 and 63 are in a coupled condition the rollers 103 on the half-link 33 are aligned with the rollers 102 or half-link 63 and thus by the aforesaid roller structure and arrangement a continuous mobile chain is provided for hoisting missiles in a vertical position from a missile stowage magazine onto the missile launcher guides.

Obviously, many modifications and variations of the present invention are possible in the light of the above teachings. It is, therefore, to be understood that within the scope of the appended claims the invention may be practiced otherwise than as specifically described.

What is claimed as new is:

1. A missile handling mechanism comprising
   an actuating chain,
   means for driving said actuating chain,
   a pair of missile handling chains movable by said actuating chain,
   coupling means on said actuating chain,
   complementary coupling means on each chain of said pair of missile handling chains,
   fixed means carrying said pair of missile handling chains and the complementary coupling means thereon,
   shifter means carrying the actuating chain and the coupling means thereon for moving said coupling means selectively into locking engagement with said complementary coupling means on the pair of missile handling chains according to the direction of movement of the shifter means,
   means connected to the shifter means for moving the shifter means in either of two directions, and
   missile engaging and clamping means on each chain of said pair of missile handling chains.

2. A missile handling mechanism according to claim 1 wherein said driving means includes
   a sprocket engagable by said actuating chain, and
   a motor in driving connection with the sprocket.

3. A missile handling mechanism according to claim 1 wherein said coupling means includes
   a half link on the actuating chain and provided with lug means, and
   a mating half link on each chain of said pair of missile handling chains and provided with complementary lug means for interlocking engagement with the lug means on the half link on the actuating chain as the shifter means is moved in either of said two directions.

4. A missile handling mechanism according to claim 1 wherein said means for moving said shifter means includes a linkage connected to the shifter means, and
   a pressure operated piston connected to said linkage.

5. A missile handling mechanism according to claim 1 wherein said shifter means includes
   a pivotally mounted housing having a track for supporting the actuating chain, and
   a half track for supporting the coupling means thereon.

6. A missile handling mechanism according to claim 1 wherein said fixed means includes
   a pair of housings for supporting one of each of said pair of missile handling chains, and
   a half track for supporting the complementary coupling means thereon.

7. A missile handling mechanism comprising
   a pivotally mounted housing,
   an actuating chain movable through said housing,
   driving means engageable with said actuating chain for imparting said movement thereto,
   a fixed housing cooperating with said pivotally mounted housing,
   a pair of missile handling chains selectively movable through said fixed housing by said actuating chain as the actuating chain is selectively coupled thereto,
   coupling means attached to said actuating chain,
   complementary coupling means attached to each chain of said pair of missile handling chains and selectively coupled to the coupling means on the actuating chain according to the direction of movement of the pivotally mounted housing,
   a linkage connected to said pivotally mounted housing,
   pressure operated means connected to said linkage for moving the pivotally mounted housing in either of two directions; and
   clamping means on each chain of said pair of missile handling chains and engageable with a missile as the missile handling chains are selectively moved by said actuating chain whereby the missiles may be selectively moved from a stowed position to a launching position.

8. A missile handling mechanism according to claim 7 wherein said pivotally mounted housing includes a shifter head having a groove for receiving the coupling means on the actuating chain, and
   a track in communication with said groove.

9. A missile handling mechanism according to claim 7 wherein said fixed housing includes a head having a pair of mutually spaced grooves for receiving the coupling means on one of each of the missile handling chains, and
   a pair of auxiliary housings having a track therein for receiving one of each of the pairs of missile handling chains and in communication with said grooves.

10. A missile handling mechanism comprising
    a pivotally mounted housing,
    an actuating chain movable through said housing,
    a gear casing in communication with said housing,
    a gear disposed within said casing in driving engagement with said actuating chain,
    pin means on said gear casing in engagement with complementary means on the housing for pivotally mounting the housing,
    a shifter head carrier by said housing and movable therewith,
    a pair of fixed auxiliary housings,
    a complementary head carried by said fixed auxiliary housings and cooperating with said shifter head,
    a hoist chain disposed in each auxiliary housing and movable therethrough by said actuating chain to hoist missiles from a stowed position to a launching position as the actuating chain is selectively coupled to said pair of hoist chains,
    a locking plate carried by each hoist chain of said pair of hoist chains and normally disposed within said complementary head,
    a complementary locking plate carried by said actuating chain and normally disposed in said shifter head and movable selectively into locking engagement with said locking plate on the hoist chains according to the direction of movement of the housing and shifter head,
    means including a pressure operated piston connected to said shifter head for moving the shifter head and housing in either of two directions, and
    guide means on the shifter head engageable with said locking plate on each hoist chain during a coupling operation for guiding and maintaining the locking plate on each hoist chain in locking relationship with the complementary locking plate on the actuating chain during said coupling operation.

11. A missile handling mechanism according to claim 10 wherein said locking plates on the actuating chain and the hoist chains include
    a pair of complementary locking lugs disposed in predetermined spaced relationship and movable into interlocking relationship according to the direction of movement of the shifter head.

12. A missile handling mechanism according to claim 10 wherein said guide and maintaining means includes
a pair of mutually spaced lugs extending outwardly from said shifter head and normally in engagement with complementary means on the locking plates of each hoist chain.

13. A missile handling mechanism comprising
a pivotally mounted housing,
an extendible and retractable main chain movable through said housing,
a coupling device carried by said chain,
a gear casing in communication with said housing,
a gear disposed within said casing for moving the main chain to an extended position,
driving means for said gear,
pin means on said gear casing in engagement with complementary means on the housing for pivotally mounting said housing for movement in either of two directions,
a shifter head carried by said housing and movable therewith, said shifter head having a groove therein for receiving said coupling device on the main chain,
a pair of fixed auxiliary housings,
a hoist chain disposed in each housing of said pair of auxiliary housings and selectively operated by said main chain,
a complementary coupling device carried by each hoist chain and selectively movable into locking engagement with the coupling device on the main chain,
a complementary head carried by said fixed auxilary housings and cooperating with the shifter head,
a pair of grooves in said complementary head, each groove receiving the complementary coupling device on the hoist chain in each housing,
locking detents on the coupling device of each hoist chain,
complementary locking detents on the coupling device of the main chain and movable selectively into locking engagement with the locking detents on the coupling device of each hoist chain according to the direction of movement of the housing and shifter head thereon,
means including a fluid operated device connected to the shifter head for selectively moving the housing and the shifter head in either of said two directions,
lug means on the shifter head engageable by said locking means on the coupling device on the hoist chains for locking the hoist chains to the shifter head, and
missile engaging means on the hoist chains for selectively engaging a missile as the hoist chains are actuated by the main chain during extension thereof.

14. A chain shifter device comprising
a housing movable selectively in either of two directions,
a main chain movable through said housing,
driving means in engagement with the main chain for driving said main chain,
a fixed housing cooperating with the movable housing,
chain means in said fixed housing and movable by said main chain as the main chain is coupled thereto,
coupling means on the chain means,
complementary coupling means on the main chain and movable into locking engagement with the coupling means on the chain means according to the direction of movement of the movable housing, and
pressure actuated means connected to said movable housing for moving the housing in either of said two directions.

15. A chain shifter device comprising a pivotally mounted housing movable in either of two directions,
a driving chain movable through said housing,
means including a motor for driving said chain,
a fixed housing cooperating with said pivotally mounted housing,
a pair of hoist chains in said fixed housing and selectively movable by said driving chain as the driving chain is coupled thereto,
coupling means on each chain of said pair of hoist chains,
groove means in said fixed housing for receiving and supporting said coupling means on each chain of said pair of hoist chains in a coupling position,
complementary coupling means on the driving chain and movable selectively into locking engagement with the coupling means on each chain of said pair of hoist chains according to the direction of movement of the pivotally mounted housing,
complementary groove means in said pivotally mounted housing for receiving and supporting said coupling means on the driving chain in coupling position with respect to coupling means on said pair of hoist chains,
linkage means connected to the pivotally mounted housing,
a piston rod connected to said linkage means, and
a pressure actuated piston head carried by said rod for moving said pivotally mounted housing in either of said two directions.

16. A chain shifter device according to claim 15 wherein said pivotally mounted housing includes
a shifter head having locking means engageable with complementary means on each coupling means on the pair of hoist chains.

17. A chain shifter device according to claim 15 wherein said complementary coupling means on each hoist chain includes
a pair of mutually spaced lugs engageable with complementary lugs on the coupling device on the driving chain according to said movement of the pivotally mounted housing.

18. A missile handling mechanism comprising a pivotally mounted housing movable in either of two directions,
a driving chain disposed within said housing and movable from a retracted position to an extended position and from an extended position to said retracted position,
a fixed housing cooperating with said pivotally mounted housing,
a pair of hoist chains disposed within said fixed housing and movable selectively by said driving chain from an initial position to a missile engaging and launcher receiving position as the driving chain is coupled thereto and from a missile engaging and launcher receiving position to an initial position,
means including a motor connected to said driving chain for moving said driving chain from said retracted position to the extended position and from said extended position to said retracted position,
coupling means on each chain of said pair of hoist chains,
complementary coupling means on the driving chain and movable selectively into locking engagement with the coupling means on the hoist chains according to the direction of movement of the pivotally mounted housing,
means including a fluid operated device connected to the pivotally mounted housing for moving the housing in either of said two directions, and
stop means on each chain of the pair of chains engageable with complementary stop means on the fixed housing for stopping the hoist chains when the hoist chain returns to said initial position.

19. A device for transferring missiles from a stowage magazine to a missile launcher comprising the combination of
a rotatable member having a plurality of missiles supported therein and movable to a transfer position,
a pair of hoist chains selectively engageable with the missiles when the missiles are in a transfer position, a power chain selectively coupled to said hoist chains for driving the hoist chains, a coupling means on the power chain, complementary coupling means on each hoist chain of the pair of hoist chains, means including a pivotally mounted shifter device for selectively coupling the coupling means on the power chain to the complementary coupling means on the hoist chains according to the direction of movement of the shifted device, means including a pressure actuated device connected to said shifter device for moving the shifter device in either of two directions, and means in driving connection with said power chain for moving the power chain and the hoist chain coupled thereto an amount sufficient to selectively transfer missiles from the stowage magazine to the missile launcher.

20. A device for transferring missiles from a stowage magazine to a missile launcher comprising the combination of a rotatable member having a plurality of missiles supported therein and movable so that a pair of missiles of said plurality of missiles are in a transfer position, a pair of hoist chain housings having one end thereof disposed beneath each missile of said pair of missiles, a hoist chain movably arranged in each housing of said pair of hoist chain housings, a pivotally mounted power chain housing cooperating with said pair of hoist chain housings, a power chain movably arranged in said hoist chain housing and selectively coupled to the hoist chains for driving the hoist chains, coupling means on the power chain, complementary means on each hoist chain of said pair of hoist chains, a shifter head carried by said pivotally mounted power chain housing and cooperating with a complementary head on the pair of hoist chain housings for selectively coupling the coupling means on the power chain to the complementary coupling means on the hoist chains according to the direction of movement of the shifter head, means including a fluid actuated piston connected to the shifter head for moving the shifter head in either of two directions, and means in driving connection with the power chain for moving the power chain and the hoist chain coupled thereto an amount sufficient to transfer said pair of missiles selectively from the stowage magazine to the missile launcher.

No references cited.